UNITED STATES PATENT OFFICE.

MARY CATHARINE PEDEN, OF CAVERNA, KENTUCKY.

IMPROVEMENT IN MEDICINAL COMPOUNDS.

Specification forming part of Letters Patent No. 195,531, dated September 25, 1877; application filed August 3, 1877.

*To all whom it may concern:*

Be it known that I, Mrs. MARY C. PEDEN, of Caverna, in the county of Hart and State of Kentucky, have invented a new and useful Improvement in Medical Compounds, of which the following is a specification:

The object of this invention is to furnish an improved medical compound for purifying the blood, and effectually curing scrofulous diseases.

The invention consists in the compound formed of the ingredients in the proportions and manner hereinafter set forth and described.

In preparing this compound, I take burdock-root, one and a half ounce, poke-root, one and a half ounce, sarsaparilla-root, one and a half ounce, and sulphur, one ounce. To these ingredients I add proof whisky, one pint, and allow it to stand twelve hours. I then add such a quantity of water that there will be one pint of the mixture when drawn off.

The compound is then allowed to stand in a cool place for one week, when it is drawn off and bottled, and is ready for use and market.

Having thus described my invention, I claim as new and desire to secure by Letters Patent—

A compound formed of burdock-root, poke-root, sarsaparilla-root, sulphur, whisky, and water, in the proportions and manner herein shown and described.

MARY CATHARINE PEDEN.

Witnesses:
E. P. BURKES,
R. R. H. GILLOCK.